United States Patent
Yevick

[45] May 22, 1973

[11] 3,734,605

[54] MECHANICAL OPTICAL SCANNER
[75] Inventor: George J. Yevick, Leonia, N.J.
[73] Assignee: Personal Communications, Inc., Stamford, Conn.
[22] Filed: July 21, 1971
[21] Appl. No.: 164,744

[52] U.S. Cl. ............353/30, 353/98, 353/121, 353/122, 355/45, 355/84
[51] Int. Cl....G03b 21/26, G03b 21/28, G03b 21/00
[58] Field of Search.................353/30, 98, 121, 353/122; 178/7.6; 355/8, 47, 51, 64, 65, 50, 44, 45; 356/24

[56] References Cited
UNITED STATES PATENTS

| | | | |
|---|---|---|---|
| 3,658,415 | 4/1972 | Miles | 353/78 |
| 3,637,281 | 1/1972 | Gull | 178/7.6 |
| 3,319,517 | 5/1967 | Rondas et al. | 353/27 |

Primary Examiner—Louis R. Prince
Assistant Examiner—Steven L. Stephan
Attorney—Harold T. Stowell et al.

[57] ABSTRACT

A magnifying and reading device for microfiche films. The required magnification is achieved by breaking up the object into a series of narrow segments and sequentially projecting them onto a viewing screen by a rocking mirror.

6 Claims, 8 Drawing Figures

PATENTED MAY 22 1973　　3,734,605

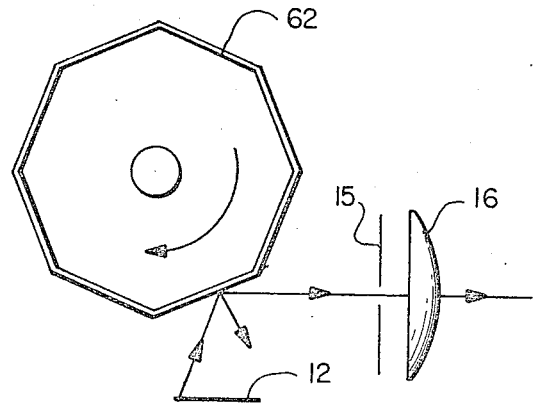
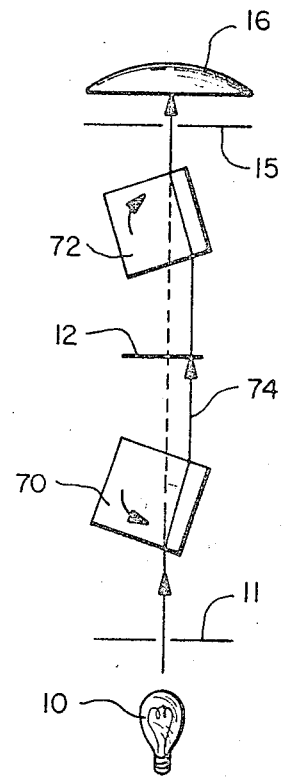
FIG. 4
FIG. 5
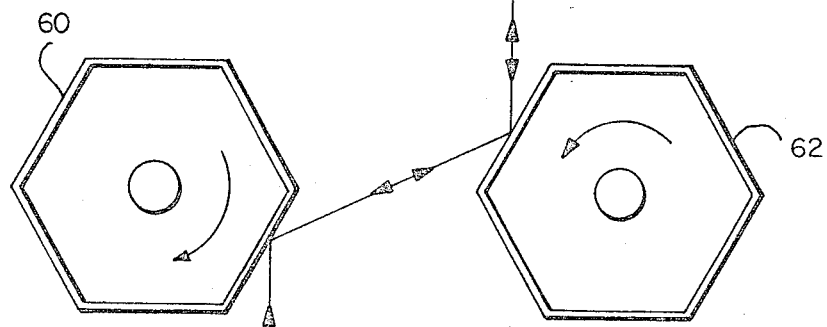
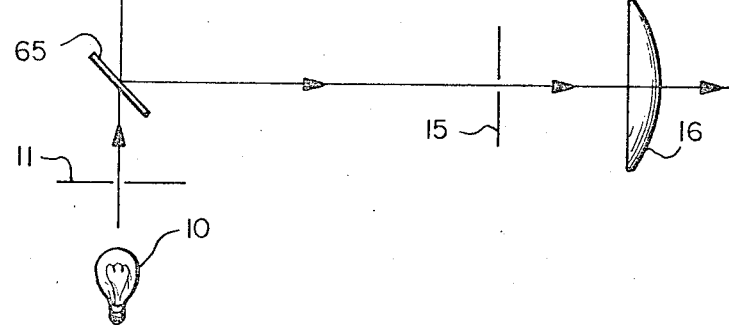
FIG. 6

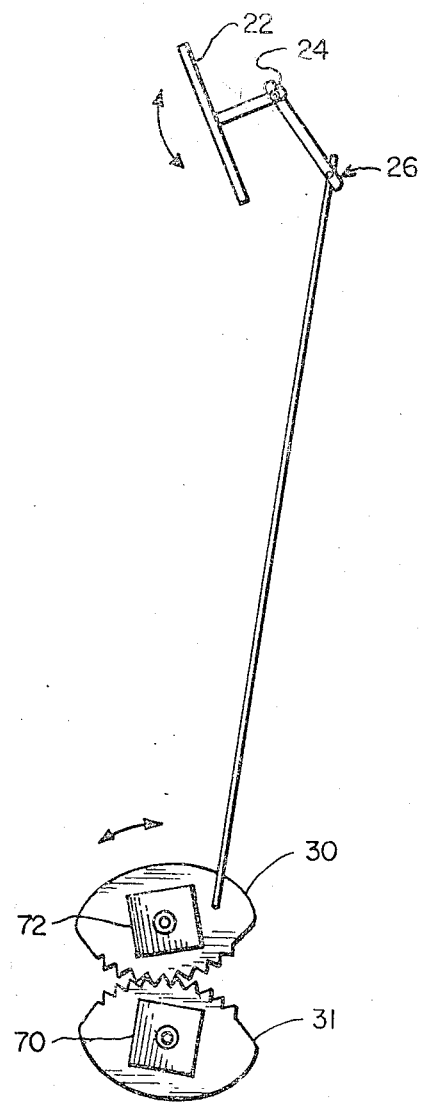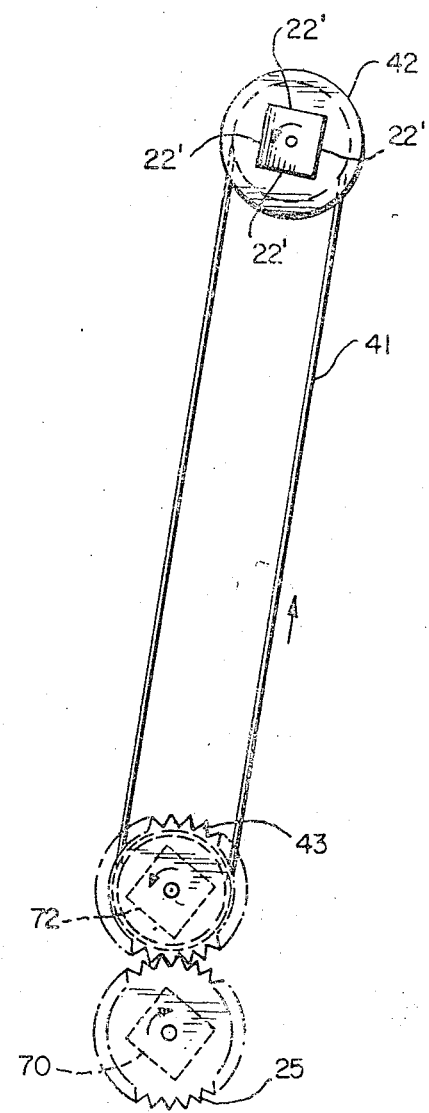
FIG. 7
FIG. 8

MECHANICAL OPTICAL SCANNER

This invention relates to a device for magnifying printing or other information which has been greatly reduced and stored on transparent films, commonly termed microfiche films. The invention exhibits utility in the presentation of magnified and stored information from any type of film, The prior art is aware of devices of this general type, often known as microfilm readers. Such devices generally operate under and employ the same basic optical arrangement that is used in motion picture projectors, slide projectors, etc. The film carrying the reduced information is illuminated and the rays passing through it traverse an optical system defined by one or more magnifying lenses. The lenses cause the light rays which have passed through the film to diverge and subsequently impinge upon a viewing screen. In order to achieve the required magnification, such systems require a large light cone, i.e., a cone whose apex or point is the film and whose base is the viewing screen. This cone is rather long, as in the case of a motion picture projection system or a conventional microfiche reader. The length of the cone may, however, be diminished by increasing the angle of the cone, i.e., the angle of divergence of the apex. An example of this is a conventional television tube wherein the length of the cone is rather small but the cone angle is rather large. Thus, prior art projection systems for obtaining the requisite magnifications have employed either long optical cones or shorter optical cones having wide angles.

According to the practice of the present invention, both the length of the cone and, even more significantly, the angle of the cone, are reduced. This is effected by utilizing only a thin slice of the light cone at any one instant of time. Thin slices of the cone are made in successive instants of time and each is projected onto a viewing screen. Each successive instant of time produces new information on the viewing screen, carried by a new and different thin slice of the cone. The terminal ends (bases) of each of the successive thin slices of the cone impinge upon a viewing screen in a rapid manner to avoid flicker. This effective division of the optical cone into thin slices greatly reduces the required angular size of the projection, at any given instant of time, onto the screen. Further, the length of the light cone is significantly reduced by the use of a plurality of mirrors which serve to fold or compress the light slices from the cone.

IN THE DRAWINGS

FIG. 4 is a view of an embodiment of the device of FIG. 3;

FIG. 5 is a view showing still another embodiment of the device of FIG. 3;

FIG. 6 is a view of an embodiment of the device of FIG. 3;

FIG. 7 is a view of a mechanism to yield the desired synchronism between the projecting rocking mirror and the object scanning means.

FIG. 8 is a view of an embodiment of the device of FIG. 7.

Figure 1:
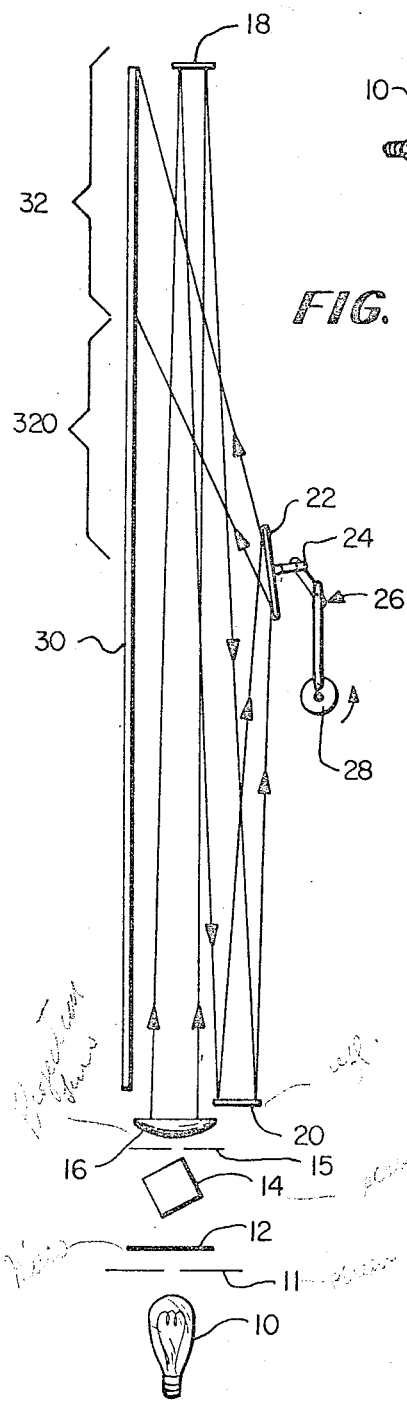
FIG. 1 is a schematic view of an optical projection and magnification system according to the present invention.
Figure 2:
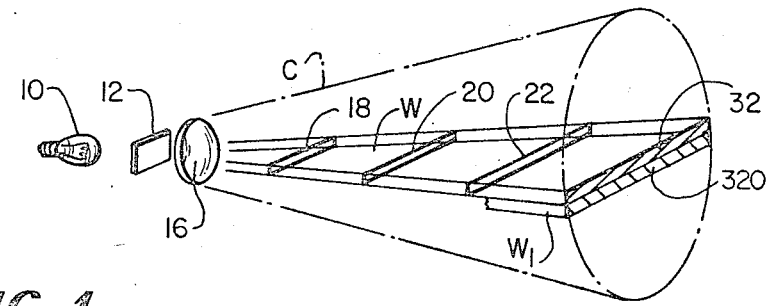
FIG. 2 is a schematic view illustrating how the light cone is broken up into a series of thin slices for projection onto a viewing screen.
Figure 3:
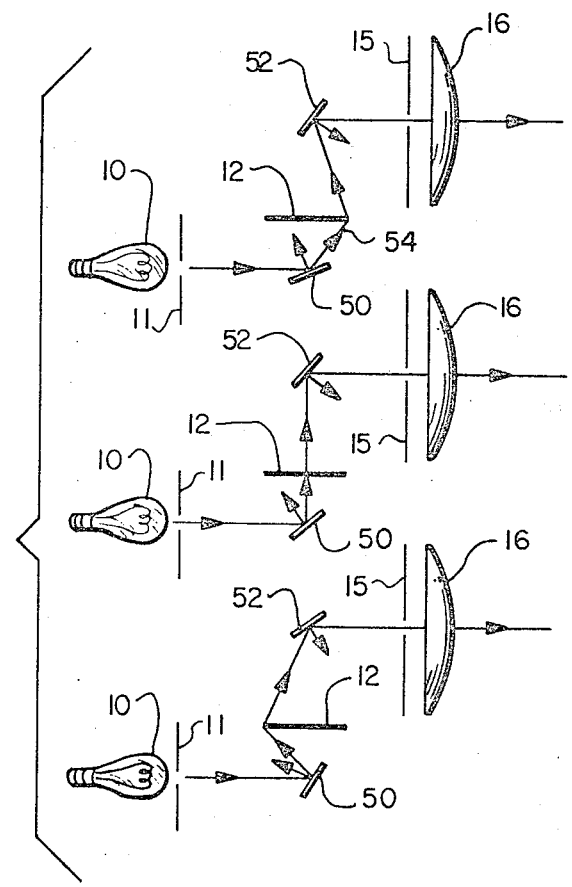
FIG. 3 is a view illustrating the mode of operation of one type of scanning device for breaking up the object into a plurality of thin wedge optical slices.

Referring now to the drawings, the numeral 10 at FIG. 1 represents a light source of any convenient type. The numeral 12 represents a microfiche or other transparent film carrying information on a greatly reduced scale. The information may be in the form of code, printing, photograph, or the like. The numeral 14 denotes a device for breaking up the light passing through the microfiche 12 into a succession of thin optical slices. The numeral 16 denotes a projection lens of conventional construction. In such a lens, parallel light rays passing to it from the scanning device 14 diverge to thereby form a light cone. The numerals 11 and 15 denote opaque screens with a slit in each, for the purpose of generating a line source of light on the film 12 and for eliminating stray light. It will be understood that lens 16 designates any desired projection system, such as a plurality of lenses for the purpose of reducing chromatic abberation, etc. The numeral 18 denotes a first reflecting surface, preferably in the form of a narrow mirror. The numeral 20 denotes a second reflecting surface, similar to element 18 and again in the form of a narrow mirror. The numeral 22 denotes still another reflecting surface in the form of a mirror. The mirror 22 is rocked about an axis of rotation 24 on a bell crank lever by means of a linkage system 26 coupled to a rotating disc 28. It will be understood that the numeral 26 denotes any mechanism or means for rocking the mirror 22. The numeral 30 denotes a conventional viewing screen and the numeral 32 denotes a section of the viewing screen which is illuminated by light reflected mirror 22 in the latter's illustrated position. The elements thus far described are housed and mounted in a suitable casing. In practice, the viewing screen 30 may be of a size such as 8 ½ × 11 inches. FIG. 2 of the drawings will assist in understanding the operation of the elements shown at FIG. 1. FIG. 3 of the drawings discloses one method of optically dissecting or breaking up the object, here the information stored on microfiche 12. Referring to the top portion of FIG. 3, the elements of means 14 are defined by a pair of rocking mirrors 50 and 52 which rock or oscillate in synchronism so that the light slice 54 reflected from the first mirror 50 traverses one of the two dimensions (either the length or the width) of the microfiche 12. Referring now to the middle sketch of FIG. 3, the mirrors 50 and 52 have so rotated that the light slice 54 now passes through the middle of the microfiche 12. Referring now to the bottom of FIG. 3, the mirrors 50 and 52 have rotated such that the light slice 54 now traverses the left most portion of the microfiche 12. After the indicated traversal from right to left, the light slice 54 now traverses from left to right and the cycle is completed. The geometric perpendicular or normal to each of the mirrors 50 and 52 is indicated by a short arrow.

The reader now will be in a position to comprehend the basic mode of operation of the system. Referring again to FIGS. 1, 2 and 3, the illumination source 10 is energized and light from it passes through the microfiche 12. In the absence of the scanning device 14 slits in 11, 15, mirrors 18 and 20, the light cone from lens 16, representing the projection through it of the microfiche 12, would be as indicated by the letter C in FIG.

2 of the drawings. This may be imagined or thought of as the conventional method of magnifying and projecting information stored on transparent films. Successive and adjacent segments of the microfiche 12 are, by the practice of this invention, broken up into thin optical wedge slices by the mechanism indicated at FIG. 3. This is shown at FIG. 2 of the drawings wherein the letter W indicates such a edge. Light passing from the lens 16 falls upon the first reflecting surface 18. The light from mirror 18 now strikes mirror 20, thence mirror 22, and thence projected onto screen 30. The intersection of the wedge W on the screen 30 is indicated by the numeral 32.

In the next instant of time, the scanning mechanism 14 illustrated at FIG. 3 now directs the reflected beam 54 to an adjacent portion of microfiche 12. The light entering lens 16 now defines (from this adjacent portion) a new and different thin wedge optical slice $W_1$. As before, the light passes to first mirror 18, back to mirror 20, thence to mirror 22. Mirror 22 is operated in synchronism with the object dissecting mechanism 14. The mirror 22 has now rotated somewhat and reflects the new wedge $W_1$. Referring to FIG. 2, the terminal portion of this new wedge $W_1$ is illustrated as below the wedge W, and its intersection with screen 30 is indicated by the numeral 320. This is also shown at FIG. 1 wherein the area encompassed by the vinculum 320 is illustrated as adjacent the terminus of 32.

The reader will now comprehend that the process of continuously scanning the microfiche 12 by breaking it up into segments, all accomplished by the mechanism 14, is carried out in synchronism with the rocking or oscillating mirror 22. The angular extent of the oscillation of mirror 22 need only be such that the reflected light encompasses the top to the bottom of the screen 30.

Again referring to FIG. 2 of the drawings, it will be apparent that the angular extent of the conventional optical cone has been significantly diminished. As known to those versed in the optical arts, a projection lens such as 16 which accommodates only small angular departures from its optical axis may be easily and more cheaply made than one which is required to accommodate large angular departures. Thus, reduction in expense of an optical component is also realized by the practice of this invention. The mirrors 18, 20 and 22 of FIG. 2 are illustrated as spaced along the optical wedge W for convenience in illustration. In practice, the wedge W is folded into roughly 2½ layers, as indicated at FIG. 1, in order to effect reduction in length of the device. Clearly, any desired number of mirrors such as 18 and 20 may be employed in order to effect still further reduction in size. In practice, the mirrors 18 and 20, as well as mirror 22, are flat.

In order to prevent flicker on the viewing screen 30, the mirror 22 must oscillate, in cooperation with the object dissecting mechanism 14, so as to present at least 45 or 50 intersections 32, 320, etc., each second. Stated somewhat differently, during each second, the mechanism must dissect the object 12 at least 45 or 50 times each second. This frequency stems from the persistence time of the human eye. In order to avoid distortion caused by different viewing screen areas swept out by the various optical wedges W, the information may be recorded on the microfiche elements 12 by placing the required information, in normal size, on a screen such as 30 and photographically recording it on a microfiche by the inverse of the method just described.

Referring now to FIG. 4 of the drawings, a modification of the mechanism 14 for dissecting the object is illustrated. Here, a regular polygonal rotating mirror 60 is positioned relative to the microfiche 12 and source 10 in the indicated manner. The indicated rotation of the mirror 60 causes back and forth scanning of the microfiche 12. The several planar reflecting surfaces of 60 cooperate with the slit 15 to produce successive wedges for projection.

Referring now to FIG. 5 of the drawings, another scanning or dissecting arrangement for the mechanism 14 is illustrated. Here, a pair of optical elements 70 and 72, formed for example of glass, and square in cross-section, are rotated as indicated by the curved arrows. The ray 74 passing from the lower element traverses the object 12 from right to left and then from left to right. Light from the source 10 falling upon the bottom face of the element 70 will be refracted as indicated due to the greater index of refraction of the glass. After passing through the glass 70, the slice 74 is again bent, by square 72, back to the original axis. If desired, the refracting elements 70 and 72 may be rocked, instead of rotated.

Referring now to FIG. 6 of the drawings, still another mechanism for scanning the microfiche is illustrated. Light from lamp 10 is focused on stationary slit 11 which is now incident on a beam splitter 65. The beam splitter may assume the form of a partially silvered mirror. The transmitted light from beam splitter 65 is incident on a rotating mirror prism 60. Light is reflected from 60 onto rotating mirror prism 62. The indicated mirror of 62 is parallel to the indicated mirror of 60. Light from 62 is now incident on fiche 12 and passes through the film and falls on fixed support mirror 66, is reflected back to 65 and thence through fixed exit slit 15 and lens 16.

In each of the embodiments of FIGS. 3 through 6, the rotation of the object dissecting elements is synchronized with the rotation of projecting rocking mirror 22. This permits a homologous relation or correspondence between the position of the scanning ray which passes through the microfiche and the light cone slice projected on the viewing screen.

FIG. 7 illustrates one mechanism for accomplishing this, and is described with relation to the scanning device shown at FIG. 5.

Two gears 30 and 31 form a rocker that rocks prisms 70 and 72 back and forth as previously described. By a linkage 26 mirror 22 is compelled to rock in synchronism with prisms 70 and 72 about axis 24. Proper registry is maintained by initial angular adjustment of mirror 22.

The mirror 22 has been illustrated as rocking or oscillating about axis 24. It will be apparent that the reflecting surface 22 may be rotated, instead of oscillated. If surface 22 is rotated, then the scanning mechanism must rotate. Similarly, if surface 22 is rocked or oscillated, then the scanning mechanism must likewise rock or oscillate in synchronism. In either case, the reflecting surface 22 is moving, and this term shall accordingly encompass both the rotating and the oscillating cases.

FIG. 8 represents an embodiment of the device of FIG. 7, wherein rotation of elements 70 and 72 is carried out, together with rotation of surface 22, here illustrated as having four reflecting surfaces 22'. Prisms 70 and 72 are caused to rotate by spring or electric motor in opposite senses of rotation. Pulleys 42 and 43 are connected by a belt or chain to rotate a four-sided mirror 22'. If the revolutions per second of mirror 22' are the same as 70 and 72, they are in synchronism. Now, by initial setting of 22', the proper register of object 12 on screen 30 will be realized.

While mirrors have been illustrated, along with prisms, for bending or deflecting light, other means could be used. For example, electro-optic beam deflectors are presently known. Lead niobate crystals are capable of deflecting light, with no moving parts.

What is claimed is:

1. An optical magnifying system for projecting an image of an object onto a screen including:
  A. A source of illumination for illuminating said object,
  B. A projecting lens,
  C. Scanning mean for sequentially transmitting light from adjacent scanned segments of said object to said projecting lens, the projecting lens in turn forming an image of each of the scanned segments,
  D. Movable reflector means positioned to intercept and reflect the imaging light to the screen so that the image of each of the scanned segments is projected onto the screen, the reflector means being movable to reflect the projected images of each of the scanned segments to different areas of the screen,
  E. Means for coupling the scanning means and the movable reflector means such that adjacent segments of the object will be projected to adjacent areas on the screen so that the system projects an image of the entire scanned object onto the screen as the object is scanned.

2. The system of claim 1 including,
  a. a plurality of mirrors positioned in the optical path between said lens and said movable reflector means and intercepting the light from the illumination source,
  b. said mirrors reflecting the light from said lens in a back and forth, serpentine, accordion, manner.

3. The system of claim 2 wherein the optical axis of said lens is generally parallel to the plane of said viewing screen, and wherein the reflecting surfaces of said plurality of mirrors are substantially perpendicular to said viewing screen.

4. The system of claim 1 wherein said (c) means is defined by a pair of plane, oscillating reflecting elements spaced from each other and between which a film is adapted to be placed, one of said pair receiving light directly from said source of illumination, and the other of said pair transmitting light to said projection lens.

5. The system of claim 1 wherein said (c) means is defined by a pair of rotatable, polygonal, flat sided reflecting elements spaced from each other, a fixed support mirror, and a partially-transmitting, partially-reflecting mirror first receiving light from said source, the transmitted light from said source then striking, in sequence, said pair of rotatable reflecting elements, thence said fixed support mirror, and back for reflection to said projecting lens from said partially-reflecting mirror.

6. The system of claim 1 wherein said (c) means is defined by a pair of oscillating or rotatable, square in cross-section, refracting elements spaced from each other and between which a film is adapted to be placed, one of said pair receiving light directly from said source of illumination, and the other of said pair transmitting light to said lens.

* * * * *